UNITED STATES PATENT OFFICE.

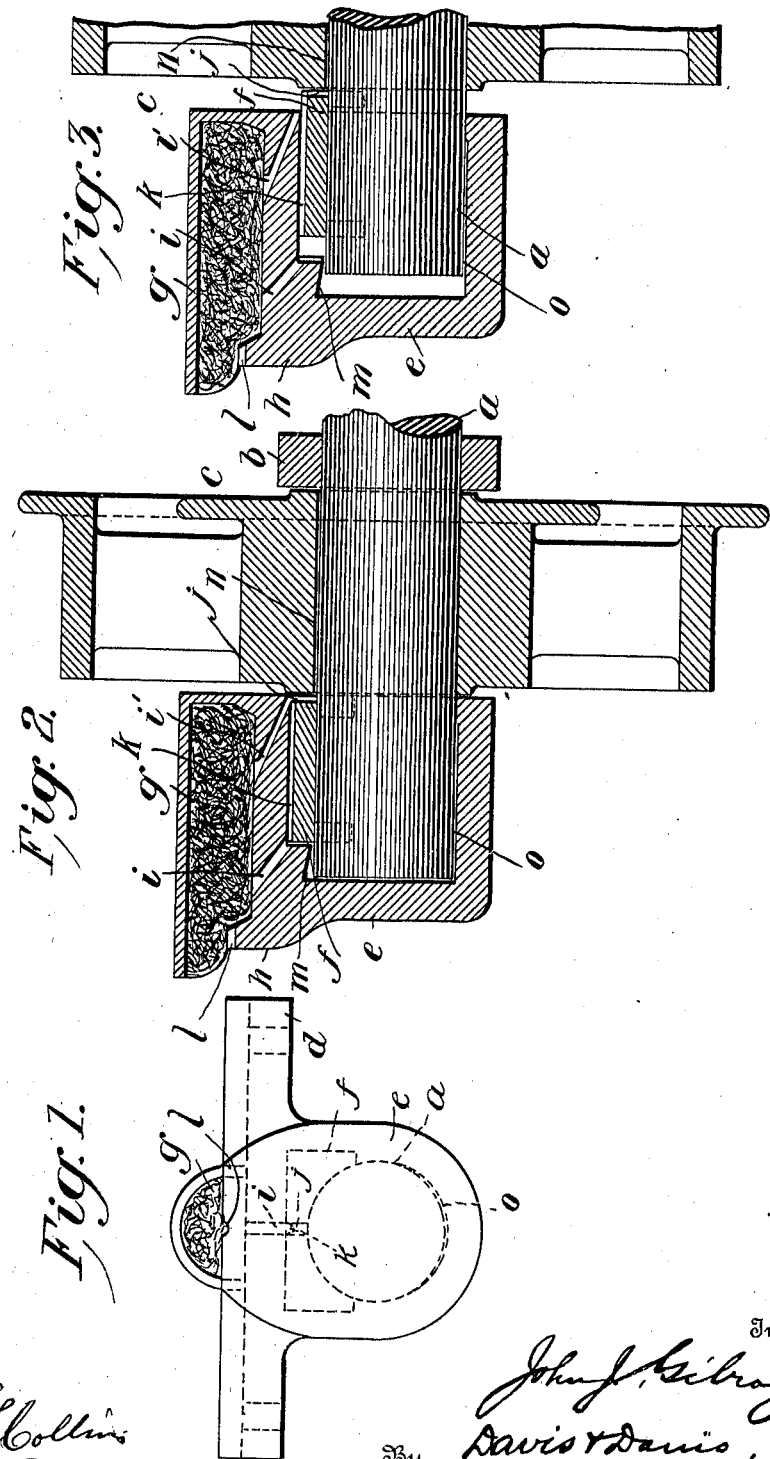

JOHN J. GILROY, OF PITTSTON, PENNSYLVANIA.

AXLE-BOX AND WHEEL OILER.

982,715.

Specification of Letters Patent.   Patented Jan. 24, 1911.

Application filed February 24, 1910.   Serial No. 545,578.

*To all whom it may concern:*

Be it known that I, JOHN J. GILROY, a citizen of the United States of America, and a resident of Pittston, in the county of Luzerne and State of Pennsylvania, have invented certain new and useful Improvements in Axle Box and Wheel Oilers, of which the following is a full and clear specification, reference being had to the accompanying drawing, in which—

Figure 1 is a front view of my improved device, the car wheel being omitted; Fig. 2 is a vertical sectional view through my improved box and a car wheel, the axle being shown in side elevation; and Fig. 3 a view similar to Fig. 2 showing the axle and the bearing-block or brass drawn out of the box by the end-wise shifting of the axle therein.

The object of this invention is to provide a combined axle-oiler and wheel-oiler which shall be simple and efficient in construction as more fully hereinafter set forth.

Referring to the drawing by reference-characters, $a$ designates the axle which is of the usual rotatable type and is provided with a collar $b$, between which collar and the inner end of the journal box the car wheel $c$ is confined on the axle in such manner as to be freely rotatable thereon. The box consists of a main body plate $d$ adapted to be bolted to the under side of the truck or car frame in the usual manner and having formed integral with it a depending tubular body portion $e$ adapted to receive the end of the axle and having its outer end closed so that the end of the axle will be completely covered and protected against the ingress of dust and dirt. In a recess formed in the upper portion of the inner face of the tubular portion $e$ is mounted a bearing block $f$ which is shaped to fit the axle and is sufficiently thick to hold the axle out of contact with the interior faces of the box, the bearing block alone receiving all the wear.

Formed integral with the box, on its upper side directly over the bearing block is a chamber $g$ whose outer end is open but whose inner end is closed, said chamber rising above the upper surface of the main body $d$ of the box and being transversely arched. The outer face of the main body portion $d$ is extended outwardly at $h$, and the outer end of the chamber $g$ is extended beyond this breast portion $h$. Two or more oil ducts $i$ and $i'$ extend downwardly and inwardly from the oil and packing chamber $g$ the outer one of these ducts terminating at the outer upper corner of the bearing block and the inner duct $i'$ terminating in a vertical groove $j$ formed in the inner face of the box immediately adjacent to the outer face of the wheel and leading to the axle. On top of the bearing block is formed an oil groove $k$ which is coincident with the duct $i'$ and groove $j$.

It will be observed that oil and packing may be readily introduced into the chamber $g$ through the outer open end thereof, a notch $l$ being formed in the upper edge of the outer wall of the chamber to facilitate the insertion of the spout of the oil can. As the axle and the wheel rotate, the oil will flow down the ducts $i$ and $i'$ and be distributed upon the axle and upon the wheel. The oil flowing down the outer duct $i$ is distributed directly on the bearing surface of the axle, the bearing block being made shorter than the bearing portion of the axle in order that the axle may project beyond its outer edge and further into the box. In order to deposit the oil directly on the bearing portion of the axle out beyond the bearing, the upper wall of the box is cut away upwardly at $m$ to form a clearance at the end of the axle and thus prevent any considerable quantity of the oil running out to the end of the axle and down upon the end face thereof. The oil that passes down the duct $i'$ is delivered directly to the outer end of the hub of the wheel where it bears against the inner face of the box, a portion of the oil passing down upon the bearing portion of the axle. In order that a portion of this oil may pass into the hub of the wheel, the hole in the wheel is made slightly larger in diameter than the axle so as to leave a slight space $n$ between the upper surface of the axle and the inner bearing surface of the hub, this space $n$ permitting the oil to distribute itself evenly throughout the wheel-bearing and to pass to the inner side of the wheel and oil the same where it bears against the collar.

In axles of this type it is necessary that the axle shall be permitted to have a free end-wise play for a limited distance. When this end-wise movement takes place in my improved construction, the bearing block follows the axle in all its movements, the block being free to move inwardly out of the box as shown in Fig. 3. When the bearing is thus drawn out of the box to follow the wheel and the axle, the top groove $k$ receives the oil from the duct $i'$ and delivers it to the vertical duct $j$, so that in all positions of the parts a continuous supply of lubricant to the wheel is maintained. It will be observed also that when the axle and bearing block thus shift end-wisely in a direction away from the box, the axle will continue to receive its proper supply of oil from the duct $i$ since the end of the axle projects far enough outwardly beyond the bearing block to receive the oil as it drips from said duct $i$. To still further insure a constant lubrication of the portion of the axle within the box, the bottom portion of the inner wall of the axle-housing is cut away or enlarged to form a well $o$, into which the oil which runs down from the axle will fall and be collected and thence be carried up on the axle as the same rotates. It will be observed further that by inclining the ducts $i$ and $i'$ outwardly toward the open end of the chamber $g$, these ducts may be readily cleaned by means of a rod or wire inserted into them through the open end of the chamber.

Having thus fully described my invention, what I claim as new and desire to secure by Letters Patent, is—

1. In combination, an axle box adapted to be stationarily attached to the car frame, said box having an axle chamber adapted to receive and inclose the end of an axle, a bearing block in the top of the axle chamber adapted to bear upon the axle, said block being slidable into and out of said chamber, a chamber in the upper part of the journal box for oil and packing, the journal box being provided with means for conducting oil to the respective inner and outer edges of said bearing block, an axle having its end extending into the axle chamber of said journal box and beyond the bearing block, said axle being end-wisely slidable with said bearing block into and out of the journal box, and a wheel journaled on said axle adjacent to the inner faces of the journal box and the bearing block, for the purposes set forth.

2. In combination, an axle-box, an axle having its end slidably and rotatably inclosed therein, a wheel journaled on the axle adjacent to the box, a slidable axle bearing block within the box, this block having an oil duct on its upper side, an oil chamber above the block and having ducts one of which delivers oil to the axle bearing and the other of which delivers oil to the aforesaid duct and thence to the wheel.

In testimony whereof I hereunto affix my signature in the presence of two witnesses this 12th day of February 1910.

JOHN J. GILROY.

Witnesses:
 THOMAS NALLY,
 MARK McDONNELL.